L. T. CONANT.
Wagon Brake.
No. 92,168. Patented July 6, 1869.
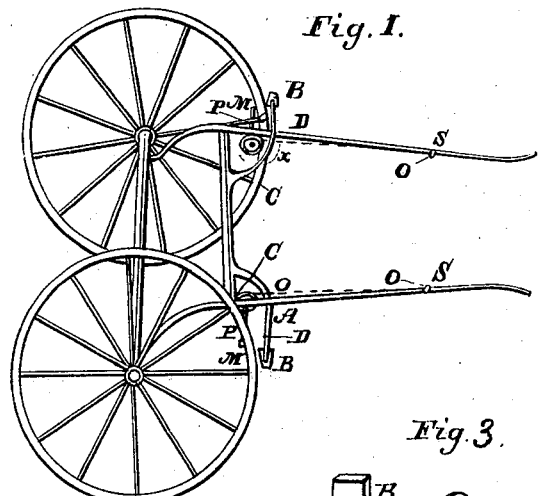
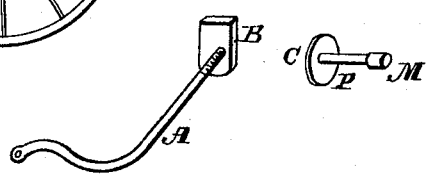
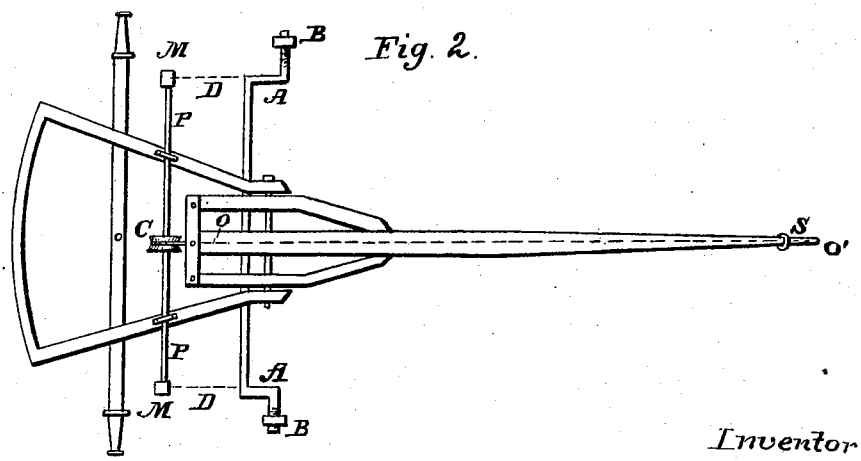
Witnesses:
Inventor:

United States Patent Office.

LEANDER T. CONANT, OF NEW LISBON, OHIO.

Letters Patent No. 92,168, dated July 6, 1869.

---

IMPROVEMENT IN WAGON-BRAKES.

---

The Schedule referred to in these Letters Patent and making part of the same.

---

*To all whom it may concern:*

Be it known that I, LEANDER T. CONANT, of New Lisbon, in the county of Columbiana, in the State of Ohio, have invented a new and and useful Wagon and Buggy Automatic Brake or Lock; and I do hereby declare that the following is a full and exact description thereof, reference being had to the accompanying drawings, and to the letters of reference marked thereon.

The nature of my invention consists in providing the horse with the means to apply the brakes at the proper time, and in an effectual manner, with little or no inconvenience to the horses.

Figure 1 is a perspective view, exhibiting the various parts of the improvement in combination, attached to the shafts of a buggy, and ready to be used.

Figure 2 is a view exhibiting the several parts of my improvement detached.

A A, lock-bars.
B B, rubber-blocks.
P P, lever-shaft.
C C, large wheels.
M M, small wheels.
D D, straps attaching lock-bars to wheels M M.
O O, straps attached to wheels c c, and to the harness.
s s, pulleys.

I provide the shafts of any ordinary buggy with iron lock-bars A A, curved at their inner ends, and bolted to the cross-bar of the shafts, extending out under the shafts to the front of the wheels, and provided with rubber-blocks B B, constructed after the form of an eccentric, with lips to hold leather, or other substances used as friction-rubbers, the blocks to be made of wood or metal, as desired.

The lock-bars are held against the shafts with common lips, screwed or bolted to the shafts.

I provide the lock-bars with springs, to force them back from the wheels when not in use.

I provide rubber-blocks, with coiled springs and stop-knots, so that in backing the buggy, the eccentric blocks will roll out of the way the coiled springs, to force them back again when required.

I also provide shafts P P, with wheels C C, fastened at one end, and smaller wheels, M M, at the other end. The lever-shafts P P are attached by their bearings to the buggy-shafts, back of the lock-bars. The lever-shafts extend outside of the buggy-shafts as far as desired.

Attached to wheels M M, are straps D D, connecting them with lock-bars A A.

Straps O O are so attached to wheels C C, that as straps O O unwind from wheels C C, straps D D wind up on wheels M M.

Straps O O pass up around pulleys s s, thence to the holdback-rings of the harness.

Now it is evident that as the buggy forces itself against the horse in descending a hill, that straps O O will rotate wheels C C, winding up straps D D on wheels M M, which will force lock-bars A A back, so that rubber-blocks B B will come in contact with the buggy-wheels, thereby supplying a self-acting brake, whereby he is enabled to descend the steepest hills with perfect safety and comparative ease.

In attaching my improvement to a two-horse carriage or wagon, it will be necessary to make some slight variations, such as the following:

The lock-bars will have to be bent forward and out at their outer ends, in order to bring them in contact with the wheels.

The lever-shaft P will have to be one continuous shaft, with wheel C fastened on the centre, and wheels, M M fastened on either end.

The lever-shaft should be so fastened, that wheel C comes at the rear end of the wagon-tongue, so that the strap O can pass up and around a pulley fastened on the forward end of the tongue, to the neck-yoke or breast-strap, whereby the same results are accomplished, as specified before.

I would here remark that there are other methods of lever-purchase, which can be equally and as effectually applied, which I will proceed to explain.

Figure 3 is a perspective drawing of the same.

The material difference consists—

First, in having hinges I I in the lock-bars, in order that they may rise out of the way in backing the buggy. There are springs used to force the blocks back to their places again after the backing of the buggy has ceased. The rubber-blocks used are any ordinary rubber-blocks.

Second, I provide levers H H, which are fastened in the lock-bar clasps, with their outer ends resting up against the lock-bars. Attached to their inner ends are straps, which pass up around pulleys on the shafts and attach to the breech-rings, and the same results are attained as before.

Having described the structure of my improvement, and some of the benefits resulting therefrom, I proceed to remark—

First, I do not claim to have invented lock-bars, with their rubber-blocks, nor springs, nor lever-power wheels, nor pulleys, nor straps, as such, and disconnectedly used.

Nor do I claim the use of any of the parts just named, except for the purposes herein set forth, and as forming necessary and dependent parts of the brake in its combination.

What I do claim as new, and of my own invention, and which I seek to secure by Letters Patent of the United States, is as follows:

The combination and arrangement of the lock-bars A A, rubber-blocks B B, lever-shafts P P, wheels C C, M M, and straps O O and D D, substantially as described.

LEANDER T. CONANT.

Witnesses:
JOHN W. MORRISON,
HARVEY MORRISON.